United States Patent
Nishita (10) Patent No.: US 8,881,412 B2
(45) Date of Patent: Nov. 11, 2014

(54) SURVEY SETTING POINT INDICATING DEVICE AND SURVEYING SYSTEM

(75) Inventor: Nobuyuki Nishita, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 360 days.

(21) Appl. No.: 13/453,230

(22) Filed: Apr. 23, 2012

(65) Prior Publication Data

US 2012/0272537 A1 Nov. 1, 2012

(30) Foreign Application Priority Data

Apr. 28, 2011 (JP) .................................. 2011-101912

(51) Int. Cl.
*G01C 15/06* (2006.01)
*G01C 15/00* (2006.01)

(52) U.S. Cl.
CPC .................................. *G01C 15/008* (2013.01); *Y10S 33/21* (2013.01)
USPC .......................... 33/293; 33/290; 33/DIG. 21

(58) Field of Classification Search
USPC ............. 33/292, 290, 293, 227, 228, DIG. 21
See application file for complete search history.

(56) References Cited

U.S. PATENT DOCUMENTS

| | | | |
|---|---|---|---|
| 5,182,863 A | 2/1993 | Rando | |
| 5,485,266 A * | 1/1996 | Hirano et al. | 33/291 |
| 5,636,018 A * | 6/1997 | Hirano et al. | 33/291 |
| 7,804,051 B2 * | 9/2010 | Hingerling et al. | 33/293 |
| 7,841,094 B2 * | 11/2010 | Schumacher | 33/282 |
| 8,006,402 B2 * | 8/2011 | Yoshizumi et al. | 33/556 |
| 8,225,518 B2 * | 7/2012 | Yanobe et al. | 33/292 |
| 2008/0229592 A1 * | 9/2008 | Hinderling et al. | 33/293 |
| 2009/0119050 A1 * | 5/2009 | Hayashi | 33/281 |
| 2010/0186243 A1 * | 7/2010 | Schumacher | 33/228 |
| 2010/0209090 A1 * | 8/2010 | Kludas | 396/89 |
| 2010/0212169 A1 | 8/2010 | Fleenor et al. | |
| 2011/0131824 A1 * | 6/2011 | Yanobe et al. | 33/292 |
| 2012/0272536 A1 | 11/2012 | Nishita | |
| 2012/0272537 A1 * | 11/2012 | Nishita | 33/293 |

FOREIGN PATENT DOCUMENTS

| | | |
|---|---|---|
| EP | 1503176 A2 | 2/2005 |
| JP | 3-27310 U | 3/1991 |
| JP | 7-159170 A | 6/1995 |
| JP | 2001-227950 A | 8/2001 |

(Continued)

OTHER PUBLICATIONS

Topcon Positioning Systems, Inc., FC-250 Catalog, "Windows Mobile 6.5 Field Controller", 2009, 2 pages.

(Continued)

*Primary Examiner* — Yaritza Guadalupe-McCall
(74) *Attorney, Agent, or Firm* — Nields, Lemack & Frame, LLC (57) ABSTRACT

A survey setting point indicating device comprises a prism device 5 and a support member, and in the survey setting point indicating device, said prism device comprises a laser emitting device 16 for emitting a laser beam 17, an omnidirectional prism 9 having a cavity 14 in a center, a mirror 18 which is provided in said cavity, is rotatable about two axes crossing at right angles, and can deflect, in an arbitrary direction, said laser beam emitted from said laser emitting device, and a control unit 19 for controlling a posture or a rotation of said mirror, and said support member supports said prism device, and said laser beam is configured to attach (transfer) a position of a center of said prism device to a required surface.

15 Claims, 8 Drawing Sheets

(56) References Cited

FOREIGN PATENT DOCUMENTS

| | | |
|---|---|---|
| JP | 2004-317406 A | 11/2004 |
| JP | 2005-30789 A | 2/2005 |
| JP | 2005-43088 A | 2/2005 |
| JP | 2007-187857 A | 7/2007 |
| JP | 2009-204557 A | 9/2009 |
| JP | 2009-236663 A | 10/2009 |

OTHER PUBLICATIONS

Notice of Allowance mailed May 19, 2014 in co-pending U.S. Appl. No. 13/445,152.

Extended European Search Report mailed Aug. 23, 2012 in co-pending European Patend Application No. 12163890.2.

* cited by examiner

SURVEY SETTING POINT INDICATING DEVICE AND SURVEYING SYSTEM

BACKGROUND OF THE INVENTION

The present invention relates to a survey setting point indicating device used for a survey work, for instance, an operation such as a determination of a survey setting point or the like and relates to a surveying system having the survey setting point indicating device.

In a survey work, for example, a survey setting work for driving a pile in a survey setting point, a surveying instrument is set in a known point, and the surveying instrument indicates the survey setting point (coordinates) and communicates an information of the survey setting point to a worker (hereinafter a pile driving worker) who drives a pile in the survey setting point.

The pile driving worker supports a survey setting point indicating device, and the surveying instrument measures a position of the survey setting point indicating device and communicates, to the pile driving worker, a deviation between the current position of the survey setting point indicating device and the survey setting point. The pile driving worker supports the survey setting point indicating device in a position in which deviation comes to be eliminated and determines a point indicated by the survey setting point indicating device as the survey setting point.

As a conventional survey setting point indicating device, there is a pole fitted with a prism. A lower end of the pole indicates a survey setting point, and a surveying instrument measures the position of the prism. When a value measured by the surveying instrument coincides with a value of the survey setting point in a state in which the pole is vertically supported, the survey setting point is determined.

Therefore, the pole is provided with a tilting detector such as a bubble tube or the like to check whether the pole stands vertically or not.

For this reason, even when the value measured by the surveying instrument coincides with the value of the survey setting point, if the pole is tilted, it is necessary to correct the pole to stand vertically (perform leveling). When a tilting of the pole is adjusted from this condition, the position of the prism is displaced in a horizontal direction and is deviated from the survey setting point. Accordingly, it is necessary to adjust further the position of the survey setting point indicating device. Therefore, setting an accurate survey setting point has required trouble operations, which adjusting of the position of the survey setting point indicating device and leveling are repeated.

Incidentally, in JP-A-2009-204557, a survey setting point indicating device in which a pole is equipped with a prism is disclosed. In JP-Utility Model-A-H3-27310, a survey setting point indicating device in which an arm extending in a horizontal direction is provided on a tripod and a prism and a plumb bob for attaching (transferring) a position of the prism to the surface of the ground are provided at a tip of the arm, is disclosed. In JP-A-2001-227950, a survey setting point indicating device in which an arm extending in a horizontal direction is provided on a tripod and a prism and a laser pointer as a means of attaching a position of the prism to the surface of the ground are provided at a tip of the prism, is disclosed.

SUMMARY OF THE INVENTION

It is an object of the present invention to provide a survey setting point indicating device and a surveying system in which it is possible to perform a determination of a survey setting point and a pile driving work with ease.

To attain the above object, a survey setting point indicating device according to the present invention comprises a prism device and a support member, and in the survey setting point indicating device, the prism device comprises a laser emitting device for emitting a laser beam, an omnidirectional prism having a cavity in a center, a mirror which is provided in the cavity, is rotatable about two axes crossing at right angles, and can deflect, in an arbitrary direction, the laser beam emitted from the laser emitting device, and a control unit for controlling a posture or a rotation of the mirror, and the support member supports the prism device, and the laser beam is configured to attach (transfer) a position of a center of the prism device to a required surface.

Further, in the survey setting point indicating device according to the present invention, the control unit controls the mirror so that a trajectory of a point projected by the laser beam on the surface becomes a predetermined pattern.

Further, in the survey setting point indicating device according to the present invention, the prism device has a tilting sensor, and the control unit controls the mirror so that the laser beam is made to project vertically or horizontally based on a detection result of the tilting sensor.

Further, in the survey setting point indicating device according to the present invention, the support member can be tilted, and an adjustment of an attached position of the laser beam is made possible by a tilting of the support member.

Further, a surveying system according to the present invention comprises a prism device which includes a laser emitting device for emitting a laser beam, an omnidirectional prism having a cavity in a center, a mirror which is provided in the cavity, is rotatable about two axes crossing at right angles, and can deflect, in an arbitrary direction, the laser beam emitted from the laser emitting device, a tilting sensor, and a control unit for controlling a rotation of the mirror, a support member for supporting the prism device, and a first communication unit and in the surveying system, the surveying instrument comprises a second communication unit, is set in a known point, and measures a position of the survey setting point indicating device, and the surveying instrument transmits a measured position of the omnidirectional prism and a position of a survey setting point to the survey setting point indicating device, and the control unit controls the mirror so that the laser beam projects the survey setting point based on the position of the omnidirectional prism and the position of the survey setting point received by the first communication unit.

Further, in the surveying system according to the present invention, the control unit controls the mirror so that a trajectory of a point projected by the laser beam on a surface becomes a predetermined pattern containing the survey setting point and a current position of the omnidirectional prism. Further, in the surveying system according to the present invention, the predetermined pattern may be a straight line, and one end of the straight line may be the current position of the omnidirectional prism and the other end of the straight line may be the survey setting point. Further, in the surveying system according to the present invention, the predetermined pattern is a circle with the current position of the omnidirectional prism as a center, and a radius of the circle is a distance from the current position of the omnidirectional prism to the survey setting point. Further, in the surveying system according to the present invention, the predetermined pattern is an ellipse with the current position of the omnidirectional prism as a center, and one end of a major axis of the ellipse is the survey setting point.

Further, in the surveying system according to the present invention, the control unit controls a posture of the mirror so that the laser beam is made to project vertically downward.

Further, in the surveying system according to the present invention, the survey setting point indicating device includes a guidance notification unit, and in a case where the position of the omnidirectional prism falls within a measurement allowable error range with respect to the survey setting point, the guidance notification unit makes a notification that the position of the omnidirectional prism falls within the measurement allowable error range.

Further, in the survey setting point indicating device according to the present invention, the mirror may be a MEMS mirror. Further, in the surveying system according to the present invention, the mirror may be a MEMS mirror.

According to the present invention, the survey setting point indicating device comprises a prism device and a support member, and in the survey setting point indicating device, the prism device comprises a laser emitting device for emitting a laser beam, an omnidirectional prism having a cavity in a center, a mirror which is provided in the cavity, is rotatable about two axes crossing at right angles, and can deflect, in an arbitrary direction, the laser beam emitted from the laser emitting device, and a control unit for controlling a posture or a rotation of the mirror, and the support member supports the prism device, and the laser beam is configured to attach (transfer) a position of a center of the prism device to a required surface. As a result, it is possible to attach the position of the center of the prism device to the required surface with ease regardless of the state of the support member. Therefore, by performing a survey setting work by using the survey setting point indicating device, it becomes easy to perform the survey setting work.

Further, according to the present invention, in the survey setting point indicating device, the control unit controls the mirror so that a trajectory of a point projected by the laser beam on the surface becomes a predetermined pattern. As a result, the laser beam not only indicates a survey setting point, but also has the function of guiding a worker to the survey setting point.

Further, according to the present invention, in the survey setting point indicating device, the prism device has a tilting sensor, and the control unit controls the mirror so that the laser beam is made to project vertically or horizontally based on a detection result of the tilting sensor. As a result, the laser beam not only indicates a position and coordinates on the surface of the ground, but also indicates a height.

Further, according to the present invention, in the survey setting point indicating device, the support member can be tilted, and an adjustment of an attached position of the laser beam is made possible by a tilting of the support member. As a result, it is possible to determine a survey setting point with ease even in a case where an erecting position of the support member does not coincide with the survey setting point.

Further, according to the present invention, in the surveying system comprises a survey setting point indicating device and a surveying instrument, and in the surveying system, the survey setting point indicating device comprises a prism device which includes a laser emitting device for emitting a laser beam, an omnidirectional prism having a cavity in a center, a mirror which is provided in the cavity, is rotatable about two axes crossing at right angles, and can deflect, in an arbitrary direction, the laser beam emitted from the laser emitting device, a tilting sensor, and a control unit for controlling a rotation of the mirror, a support member for supporting the prism device, and a first communication unit and the surveying instrument comprises a second communication unit, is set in a known point, and measures a position of the survey setting point indicating device, and the surveying instrument transmits a measured position of the omnidirectional prism and a position of a survey setting point to the survey setting point indicating device, and the control unit controls the mirror so that the laser beam projects the survey setting point based on the position of the omnidirectional prism and the position of the survey setting point received by the first communication unit. As a result, it is possible to attach the position of the center of the prism device to the required surface with ease regardless of the state of the support member, and perform a survey setting work easily and efficiently.

Further, according to the present invention, in the surveying system, the control unit controls the mirror so that a trajectory of a point projected by the laser beam on a surface becomes a predetermined pattern containing the survey setting point and a current position of the omnidirectional prism. As a result, the laser beam not only indicates a survey setting point, but also has the function of guiding a worker to the survey setting point.

Further, according to the present invention, in the surveying system, the control unit controls a posture of the mirror so that the laser beam is made to project vertically downward. As a result, it is possible to attach the center of the prism device to the surface of the ground at all times regardless of the state of the support member.

Further, according to the present invention, in the surveying system, the survey setting point indicating device includes a guidance notification unit, and in a case where the position of the omnidirectional prism falls within a measurement allowable error range with respect to the survey setting point, the guidance notification unit makes a notification that the position of the omnidirectional prism falls within the measurement allowable error range. As a result, the worker can perform a survey setting work by only watching a position projected by the laser beam and the workability improves.

Furthermore, according to the present invention, in the surveying system, the mirror is a MEMS mirror. As a result, it is possible to make the prism device lighter. In addition, since it is possible to rotate the mirror at high speed and deflect the laser beam at high speed in an arbitrary direction, it is possible to project the laser beam in an arbitrary pattern.

BRIEF DESCRIPTION OF THE DRAWINGS

FIG. 4A and FIG. 4B are operation explanatory diagrams of the prism device, FIG. 4A shows a case in which the prism device is supported in a vertical state, FIG. 4B shows a case in which the prism device is supported at a tilt;

DETAILED DESCRIPTION OF THE PREFERRED EMBODIMENTS

Description will be given below on an embodiment of the present invention by referring to the attached drawings.

Figure 1:
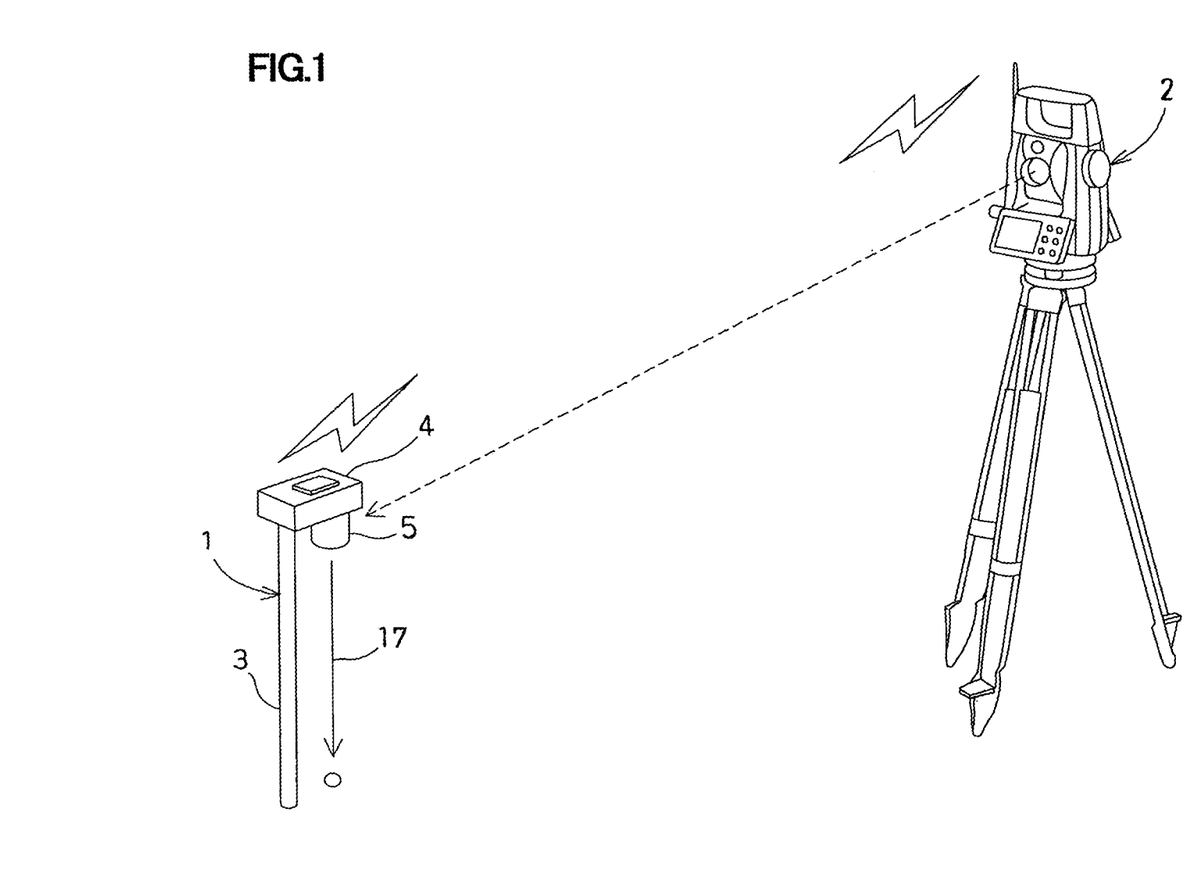
FIG. 1 is a schematic diagram of a surveying system provided with a survey setting point indicating device.

FIG. 1 shows a survey setting point indicating device and a surveying system provided with the survey setting point indicating device according to the embodiment of the present invention. In the drawing, reference numeral 1 denotes a survey setting point indicating device, and reference numeral 2 denotes a surveying instrument, which is set in a known point. Each of the survey setting point indicating device 1 and the surveying instrument 2 is provided with a communication unit which can send and receive an information necessary to perform a survey setting work.

The surveying instrument 2 measures a position of the survey setting point indicating device 1 (measurement coordinates), compares the measurement coordinates with a position in which pile driving is performed (pile driving coordinates), and sends a guidance information to a survey setting point indicating device 1 side so that the measurement coordinates coincide with the pile driving coordinates.

The survey setting point indicating device 1 comprises a support member 3 with rod-like shape, a guiding system 4, and a prism device 5. The guiding system 4 is provided at an upper end of the support member 3 and extends in a horizontal direction at a right angle with respect to the support member 3. The guiding system 4 functions as a support member of the prism device 5, and, on the lower surface of the guiding system 4, the prism device 5 is provided.

Figure 2:
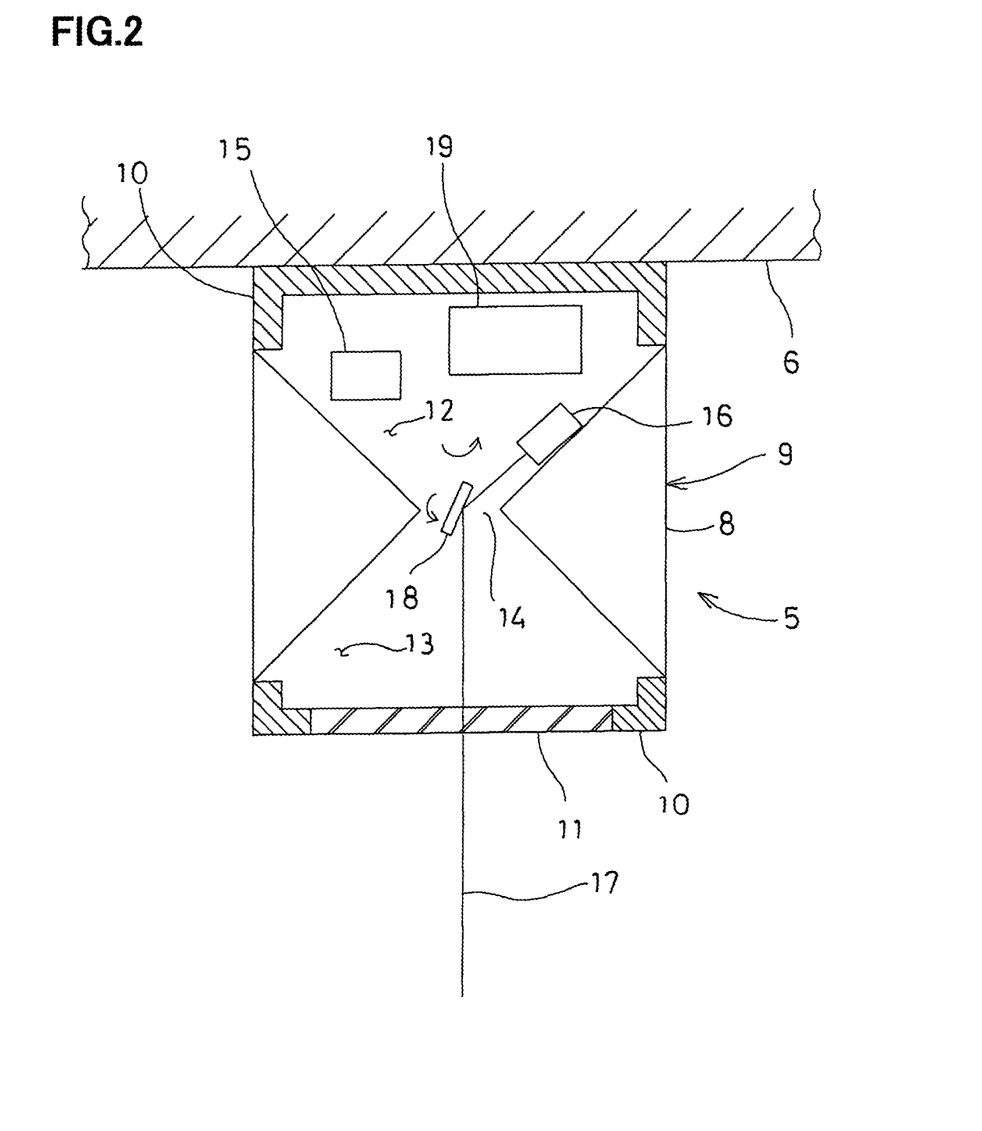
FIG. 2 is a schematic sectional view of a prism device used in an embodiment according to the present invention.

Description will be given on the basic construction of the prism device 5 by referring to FIG. 2.

A plurality of prisms 8 are disposed in a circumferential direction so as to reflect a distance measuring light which enters the prisms 8 from an arbitrary direction of the circumferential direction, and the plurality of prisms 8 form an omnidirectional prism 9. The omnidirectional prism 9 is held by a prism holder 10 and is fixed to a prism support unit 6 via the prism holder 10. In the bottom of the prism holder 10, a projecting window 11 is provided.

The prism device 5 has a sealed structure, and spaces 12 and 13 are formed inside the prism device 5 above and below the omnidirectional prism 9. In the center portion of the omnidirectional prism 9, a cavity 14 is formed.

In the space 12, an tilting sensor 15, for example, an acceleration sensor is provided, and a laser emitting device 16 for emitting a laser beam 17, for instance, a laser pointer is provided. In the cavity 14, a MEMS mirror 18 is provided, and the laser beam 17 emitted from the laser emitting device 16 is configured to enter the center of the MEMS mirror 18, and the laser beam 17 is reflected by the MEMS mirror 18, and is configured to project through the projecting window 11. The laser beam 17 projected from the projecting window 11 attaches (transfers) the position of the center of the prism device 5 onto a surface, for example, the surface of the ground.

The MEMS mirror 18 is rotatable about a vertical line and is also rotatable about a horizontal line (which is perpendicular to a paper surface). The MEMS mirror 18 is rotatable in two directions about the same center of rotation. Moreover, the laser beam 17 enters the center of rotation of the MEMS mirror 18, and the center of rotation coincides with the prism center of the omnidirectional prism 9. It is to be noted that the center of the MEMS mirror 18 and the center of rotation coincide with each other.

Moreover, the laser emitting device 16 and a control unit 19 for controlling a driving of the MEMS mirror 18 are accommodated in a required position of the space 12. The detection result from the tilting sensor 15 is input to the control unit 19 as a signal for controlling the MEMS mirror 18. The control unit 19 may be provided outside the prism device 5.

Based on FIG. 3, description will be given on an outline of the surveying system according to the present embodiment.

As described above, the surveying system is formed mainly of the survey setting point indicating device 1 and the surveying instrument 2. It is to be noted that the survey setting point indicating device 1 may include the guiding system 4 which will be described below.

Figure 3:
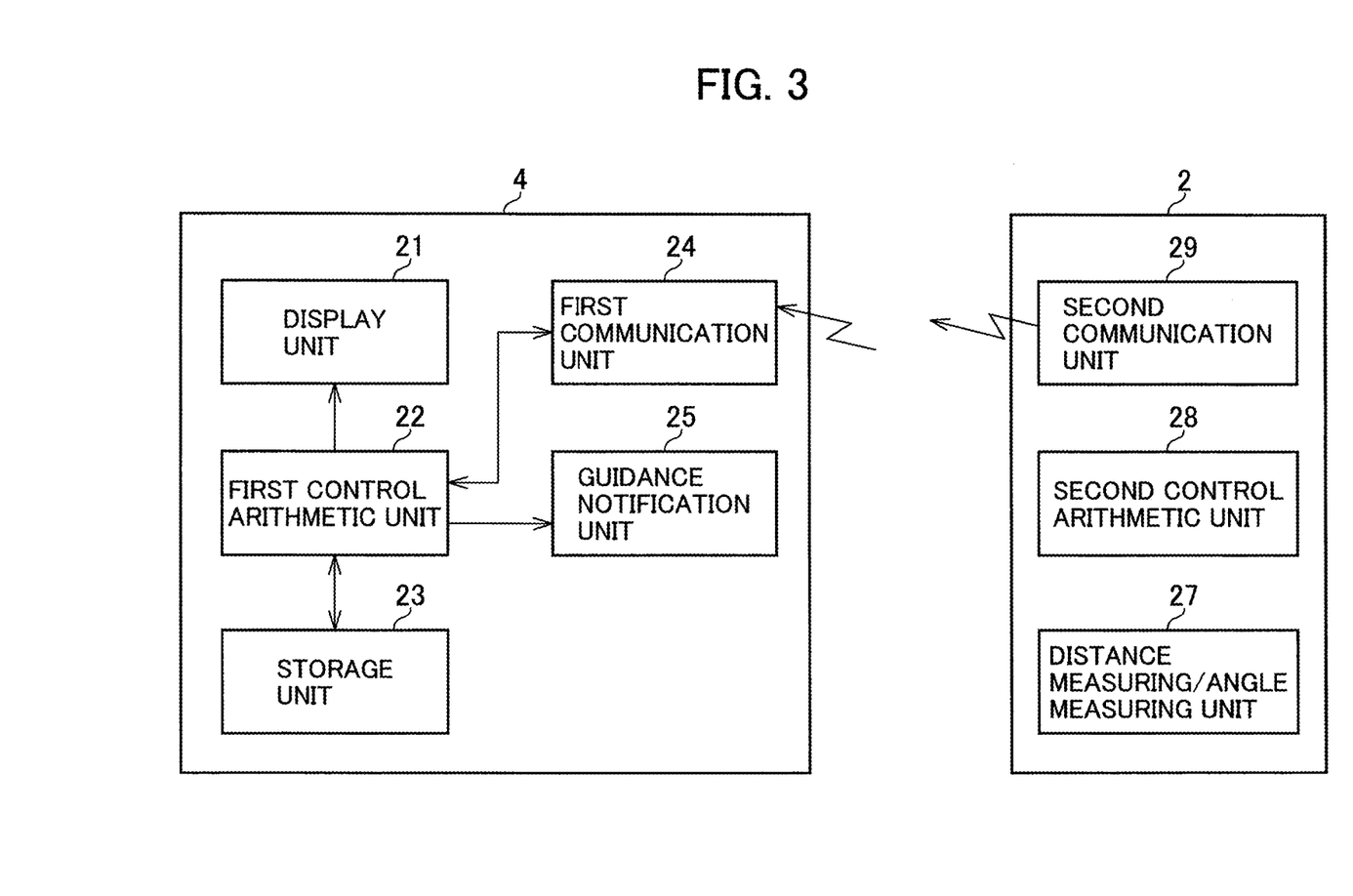
FIG. 3 is a schematic block diagram of a guiding system and a surveying instrument in the embodiment.

As shown in FIG. 3, the guiding system 4 has a display unit 21 for displaying a work status, information to a survey setting point, or the like, a first control arithmetic unit 22, a storage unit 23 for storing the data such as the coordinates of the survey setting point, the data transmitted from the surveying instrument 2, or the like, a first communication unit 24 for performing data communication with the surveying instrument 2, and a guidance notification unit 25 for notifying the state of positioning of the survey setting point and the survey setting point indicating device 1.

Moreover, the surveying instrument 2 has a distance measuring/angle measuring unit 27 which measures the distance to an object to be measured by projecting the laser beam (the distance measuring light) 17 and receiving a reflected laser beam (a reflected distance measuring light) from the object to be measured and a direction of the object to be measured when the laser beam is received. The surveying instrument 2 has a second control arithmetic unit 28 which controls the distance measuring operation of the surveying instrument 2, and a second communication unit 29 which performs data communication between the survey setting point indicating device 1 and the guiding system 4.

The coordinates of the survey setting point are input to the second control arithmetic unit 28 in advance. In the distance measuring/angle measuring unit 27, the position (the measurement coordinates) of the omnidirectional prism 9 is measured and the measurement result is compared with the coordinates of the survey setting point, and informations such as the measurement result, the coordinates of the survey setting point, a difference between the survey setting point and the current position, and guiding information to the survey setting point are transmitted by wireless to the guiding system 4 in real time via the second communication unit 29.

The guiding system 4 receives, via the first communication unit 24, the information transmitted from the second communication unit 29, such as the measurement result and the information regarding the coordinates of the survey setting point. The first control arithmetic unit 22 displays the received coordinates of the survey setting point and the current position of the support member 3, that is, the omnidirectional prism 9 on the display unit 21, or displays on the display unit 21 an amount of deviation between the coordinates of the survey setting point and the current position, a moving direction to make the amount of deviation be zero, or the like.

Furthermore, the first control arithmetic unit 22 inputs, to the control unit 19, the information such as the amount of deviation between the coordinates of the survey setting point and the current position and further, the moving direction to make the amount of deviation be zero, or the like.

The control unit 19 controls an orientation (a posture) and a movement of the MEMS mirror 18 based on the tilting detection result from the tilting sensor 15 and the above-described information. By the fact that the posture and movement of the MEMS mirror 18 are controlled, the projecting direction of the laser beam 17 and the movement of the laser beam 17 are controlled.

It is to be noted that control patterns of the MEMS mirror 18 in accordance with the input information are set in the control unit 19 in advance, and a movement pattern of the laser beam 17 is determined by selecting the control pattern. The control unit 19 controls the movement of the MEMS mirror 18 based on the selected control pattern so that the trajectory of a point projected by the laser beam 17 moves in a predetermined pattern.

As the control pattern, the laser beam 17 is projected so as to scan back and forth on a straight line or is projected so as to draw a circle or an ellipse.

Figure 4A:
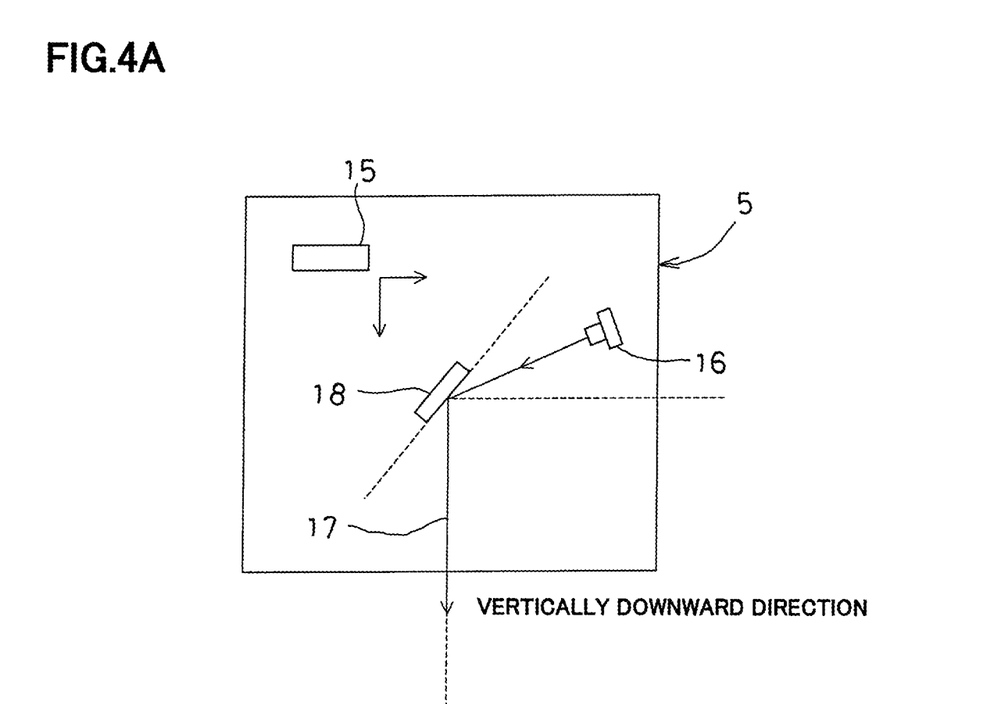
Figure 4B:
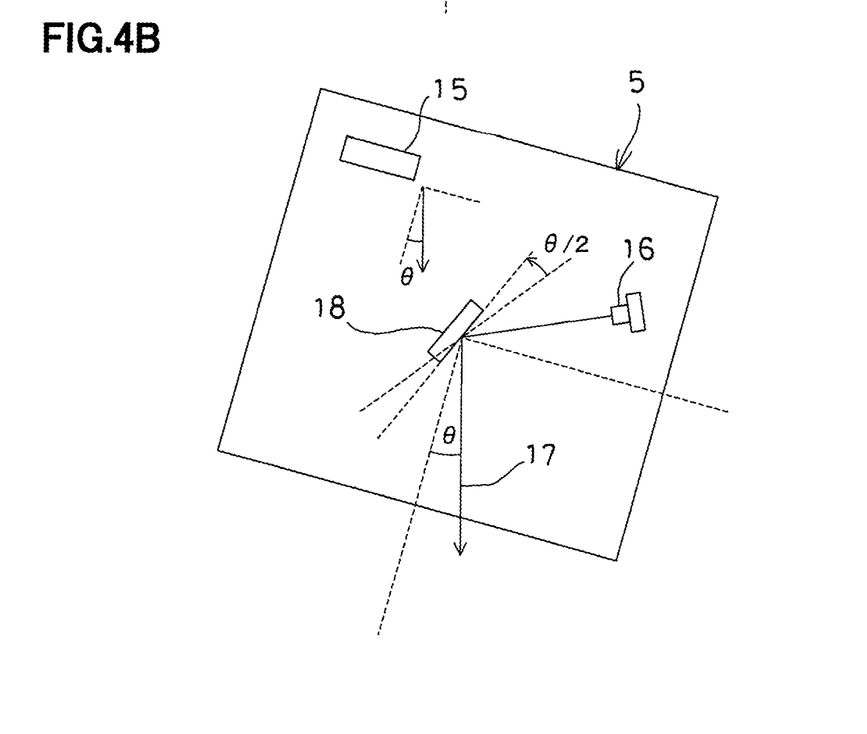

By referring to FIG. 4A and FIG. 4B, description will be given on an example of control of the posture of the MEMS mirror 18 and control of the projecting direction of the laser beam 17. Incidentally, FIG. 4A and FIG. 4B show cases in which the position (the coordinates) of the center of the omnidirectional prism 9 is attached to the surface of the ground by the laser beam 17 as a point, and the posture of the MEMS mirror 18 is controlled so that the laser beam 17 is always projected vertically downward. Moreover, the surveying instrument 2 measures the position of the center of the omnidirectional prism 9.

FIG. 4A shows a state in which the support member 3 is in a vertical state, and the vertical state is detected by the tilting sensor 15. The control unit 19 controls the posture of the MEMS mirror 18 so that the laser beam 17 reflected by the MEMS mirror 18 is projected vertically downward.

FIG. 4B shows a state in which, for example, the omnidirectional prism 9 is rotated θ degrees in a clockwise direction on the paper surface. The tilting of the omnidirectional prism 9 is detected by the tilting sensor 15, and the control unit 19 rotates the MEMS mirror 18 θ/2 degrees in a counterclockwise direction based on the detection signal of the tilting sensor 15. As a result, the laser beam 17 reflected by the MEMS mirror 18 is projected vertically downward, and the laser beam 17 attaches the center of the omnidirectional prism 9 to the surface of the ground.

In this way, regardless of the tilting of the support member 3, it is possible to attach the position of the center of the omnidirectional prism 9 to the surface of the ground accurately.

Furthermore, by erecting the support member 3 near the survey setting point, tilting the support member 3 with an erected point as a center, or rotating (twisting) the support member 3 with the support member 3 as a center, or adjusting the position of the omnidirectional prism 9, it is possible to make the position of the omnidirectional prism 9 coincide with the survey setting point with ease. Moreover, in a case where the position of the omnidirectional prism 9 coincides with the coordinates of the survey setting point or in a case where the position of the omnidirectional prism 9 falls within an allowable error range, the guidance notification unit 25 produces a sound or vibrates and notifies the worker that the position of the omnidirectional prism 9 coincides with the survey setting point.

By the fact that the guidance notification unit 25 produces the sound or vibrates, the worker can perform a pile driving work without checking a display of the display unit 21. Alternatively, instead of producing the sound by the guidance notification unit 25 or vibrating of the guidance notification unit 25, the laser beam 17 may be made to flash simultaneously.

Moreover, since it is possible to attach the position of the omnidirectional prism 9 accurately to the surface of the ground by the laser beam 17 regardless of a posture of the support member 3, it is possible to mark the survey setting point and further, to perform pile driving immediately after one positioning operation is performed.

The surveying instrument 2 may be a surveying instrument with a tracking function or a surveying instrument without a tracking function. By the surveying instrument with a tracking function, one worker can perform pile driving.

Figure 5:
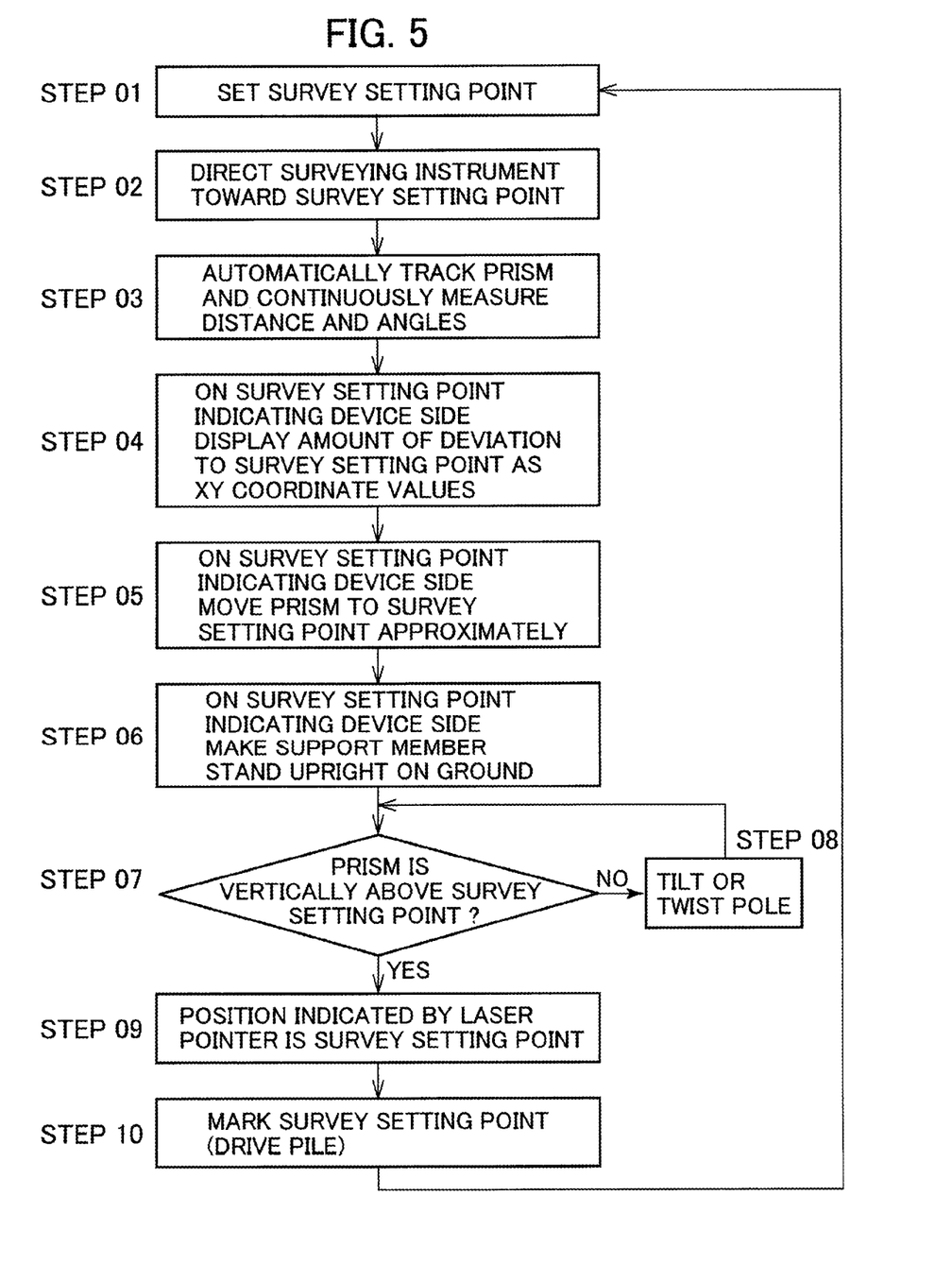
FIG. 5 is a flow chart of the embodiment.

By referring to FIG. 5, description will be given on a flow of a pile driving operation according to the present embodiment. Incidentally, description will be given below on a case in which a survey setting work is performed by using a surveying instrument 2 with a tracking function, such as a total station.

(STEP 01) An information regarding a survey setting point is set and input to the surveying instrument 2.

(STEP 02) The surveying instrument 2 is directed toward the survey setting point, and a survey setting point indicating device 1 is held in a direction of the survey setting point.

(STEP 03) The surveying instrument 2 is operated and made to start tracking an omnidirectional prism 9. Concurrently with starting tracking the omnidirectional prism 9, the surveying instrument 2 continuously measures a distance to the omnidirectional prism 9 and the angles (a horizontal angle and a vertical angle) of the omnidirectional prism 9. A measurement result and coordinate data of the survey setting point are transmitted to the survey setting point indicating device 1.

(STEP 04) In the survey setting point indicating device 1, an amount of deviation between the current position and the survey setting point is calculated based on the information transmitted from the surveying instrument 2, and the amount of deviation is displayed. It is to be noted that the amount of deviation is displayed as the XY coordinate values or an arrow indicating a direction of deviation, and length of the arrow may be varied depending on the amount of deviation.

(STEP 05, STEP 06) When the omnidirectional prism 9 gets closer to the survey setting point and the position of the omnidirectional prism 9 nearly coincides with the survey setting point, a support member 3 is made to stand upright on the ground.

(STEP 07) A position of the omnidirectional prism 9 is checked based on the measurement result of the surveying instrument 2 and is determined whether or not the omnidirectional prism 9 is positioned vertically above the survey setting point.

(STEP 08) In a case where the omnidirectional prism 9 is not vertically above the survey setting point, the support member 3 is tilted with respect to a vertical direction with a lower end of the support member 3 as a center or is rotated (twisted) with an axis of the support member 3 as a center, and the position of the omnidirectional prism 9 is adjusted so that the position of the omnidirectional prism 9 becomes vertically above the survey setting point.

(STEP 09) In a state in which it is confirmed that the omnidirectional prism 9 is vertically above the survey setting point, a laser beam 17 is projected from a laser emitting device 16. The emitted laser beam 17 is projected on the survey setting point. Or while the laser beam 17 is projected from the laser emitting device 16, the position adjusting may be performed.

(STEP 10) The survey setting point is marked (a pile is driven). One survey setting work is completed, and the procedure proceeds to the determination of a next survey setting point.

In the above-described survey setting point determination work performed by using the survey setting point indicating device 1, regardless of a posture (a tilting or a twist) of the support member 3, the laser emitting device 16 always projects a laser beam on an area vertically below the center of the omnidirectional prism 9. Accordingly, since the worker does not pay attention to maintain a vertical posture of the support member 3 and it is enough for the worker to concentrate on making a position illuminated by the laser emitting device 16 coincide with the survey setting point. Therefore, the workability is improved greatly.

Incidentally, the information of the survey setting point may be set and input to a storage unit 23 of a guiding device 4 in advance.

In the embodiment described above, the laser beam 17 is made to project in a vertical direction. Instead, the laser beam 17 may be made to project in a desired direction by controlling the posture of a MEMS mirror 18 by a control unit 19.

Figure 6:
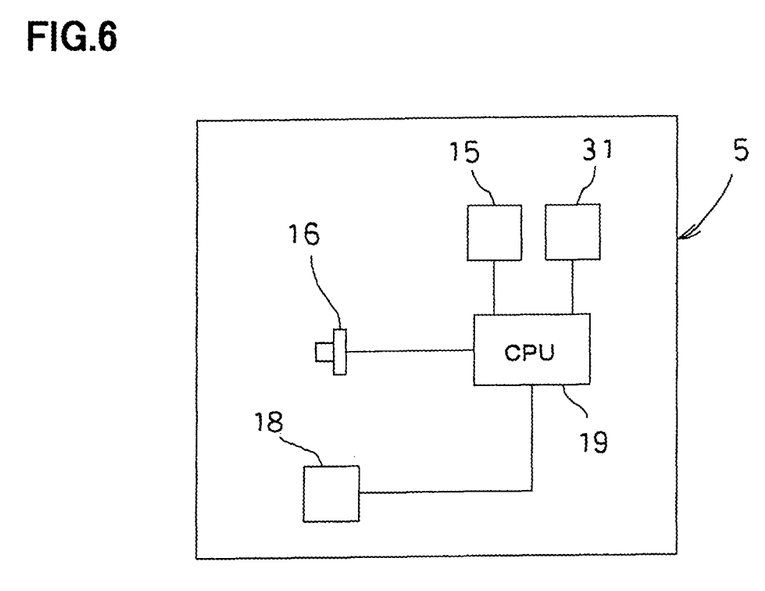
FIG. 6 is an explanatory drawing of a principal portion of a prism device of a second embodiment.
Figure 7:
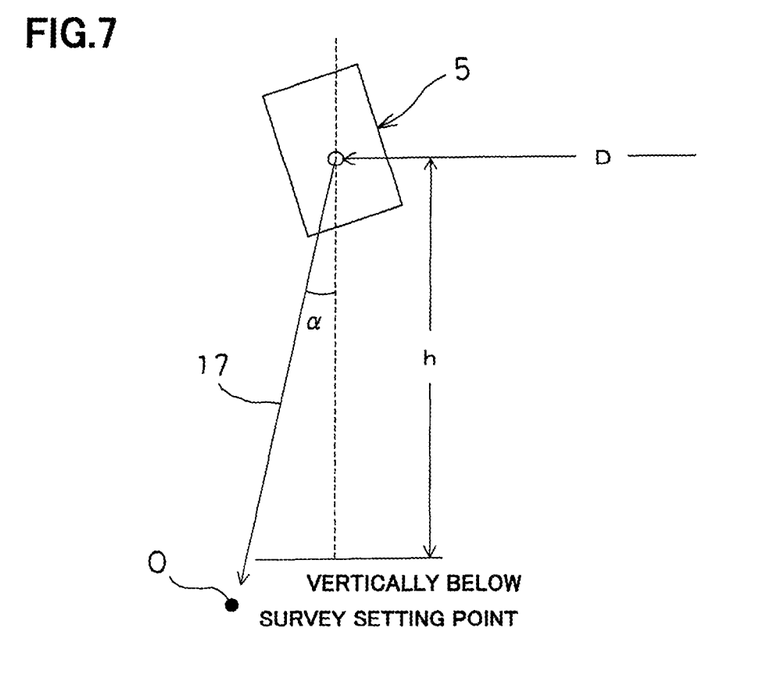
FIG. 7 is an operation explanatory drawing of the second embodiment.

FIG. 6 and FIG. 7 show a second embodiment. In the second embodiment, control is performed so that a point projected by a laser beam 17 becomes a survey setting point by making the laser beam 17 project at a required angle, not in a vertical direction.

A prism device 5 in the second embodiment comprises an azimuth sensor 31 (for example, a magnetic sensor) in addition to a tilting sensor 15 and it is possible for the prism device 5 to detect an azimuth (an orientation) of the prism device 5 in addition to the tilting.

Since the center (the prism center) of the prism device 5 can be measured by the surveying instrument 2 and the prism device 5 is provided at a known height of a support member 3, a horizontal position D and a height position h become known values.

The position (the coordinates) of the prism device 5 is measured by the surveying instrument 2. By comparing the current position of the prism device 5 with the position (the coordinates) of a survey setting point O, it is possible to calculate a distance and a direction of the survey setting point O with respect to the current position. Furthermore, it is also possible to calculate a projection angle α for making a point projected by the laser beam 17 coincide with the survey setting point O. Therefore, by controlling the posture of the MEMS mirror 18, it is possible to make the laser beam 17 reflect toward the survey setting point O.

Therefore, if the prism device 5 is not made to completely coincide with the position of the survey setting point O, it is possible to attach the survey setting point O to the surface of the ground by the laser beam 17. In the second embodiment, by erecting a survey setting point indicating device 1 near the survey setting point O, it is possible to attach the survey setting point O automatically by the laser beam 17 and the workability further improves.

In the embodiments described above, the laser beam 17 is projected in a standstill state and the survey setting point is shown as one point. However, a guiding function may be added, the guiding function that performs a dynamic projection of the laser beam 17 and guides to the survey setting point by the projection of the laser beam 17.

Figure 8:
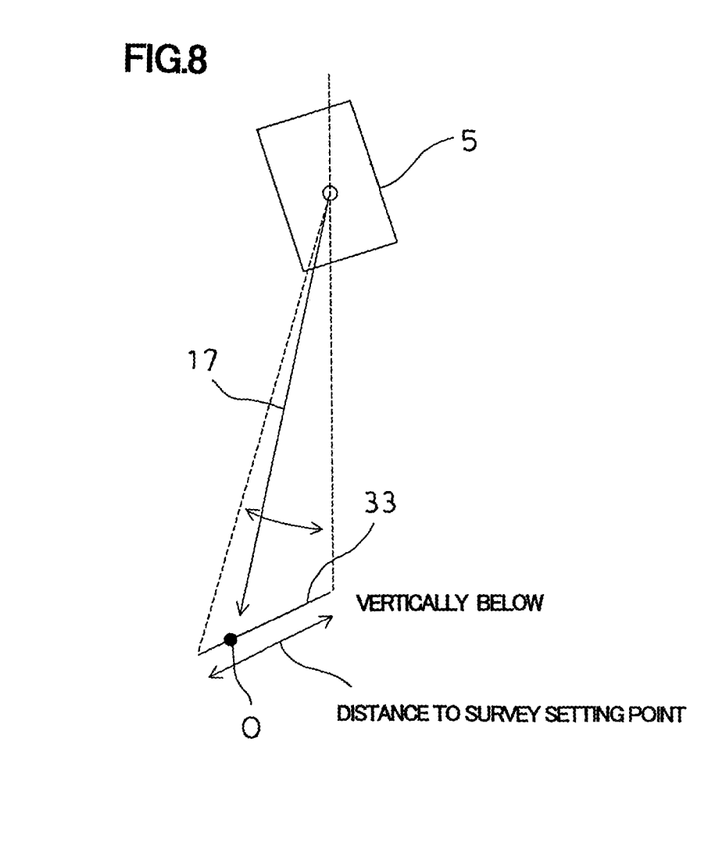
FIG. 8 is another operation explanatory drawing of the second embodiment.

FIG. 8 shows a case where the MEMS mirror 18 is controlled dynamically so that the laser beam 17 is made to scan back and forth. By controlling the MEMS mirror 18 dynamically, it is possible to form a straight line 33 passing through the survey setting point O or containing the survey setting point O on the surface of the ground. Furthermore, the direction of the straight line 33 is made to coincide with a moving direction to the survey setting point O, and further, the length of the straight line 33 is brought into correspondence with the distance from the current position to the survey setting point O. Therefore, based on the direction and length of the straight line 33 as drawn, the pile driving worker can grasp the moving direction and a moving amount. That is, the straight line 33 makes it possible to guide the worker so that the worker can move appropriately. Furthermore, by the straight line 33 being shown, the worker can perform operations without viewing the display unit 21 of the guiding system 4.

It is to be noted that as one of the patterns of making the laser beam 17 scan back and forth, the laser beam 17 is made to scan back and forth between the current position of the prism device 5 and the survey setting point O by using the current position of the prism device 5 as a starting point (a point to which the laser beam 17 is projected vertically downward from the prism device 5).

Figure 9:
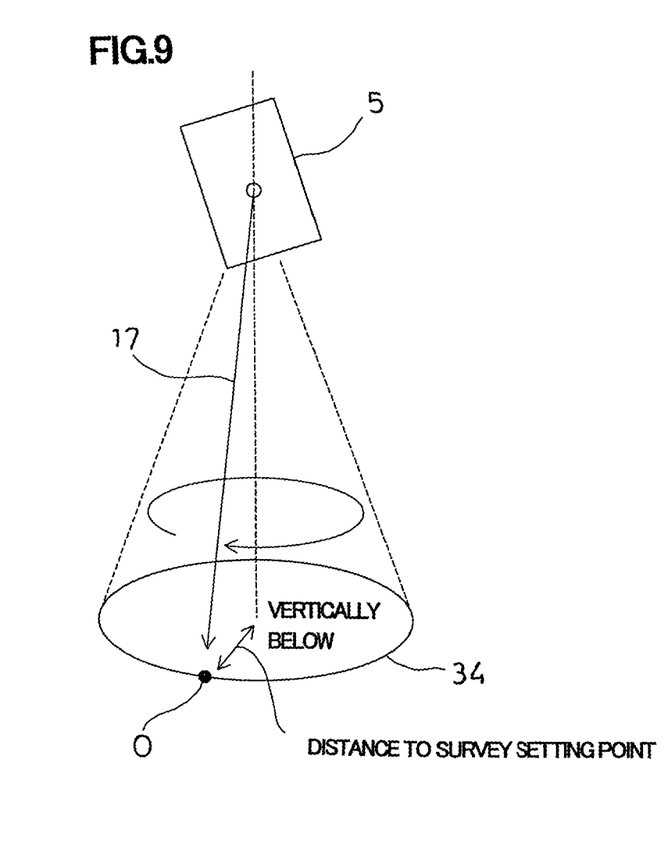
FIG. 9 is an operation explanatory drawing showing a first application example.

FIG. 9 shows an application example in a case where the laser beam 17 is projected dynamically.

In the application example shown in FIG. 9, the posture of the MEMS mirror 18 is dynamically controlled so that a circle 34 is drawn by the laser beam 17.

The circle 34 is a circle passing through the survey setting point O. The center of the circle 34 corresponds to a position located vertically below the prism device 5, and the radius of the circle 34 corresponds to the distance from the center to the survey setting point O. Therefore, the size of the circle 34 corresponds to the moving amount (the deviation between the current position and the survey setting point O). Thus, when the prism device 5 gets closer to the survey setting point O, the circle 34 becomes smaller. As a result, the worker can determine whether the moving direction is correct or not by checking a change in the size of the circle 34. Incidentally, the straight line 33, as well as the circle 34, may be drawn. Alternatively, the laser beam 17 may describe an ellipse and indicate a moving direction of the worker as the direction of the major axis of the ellipse. In this case, the center of the ellipse corresponds to the current position of the survey setting point indicating device 1, and an end of the major axis of the ellipse corresponds to the survey setting point O.

Figure 10:
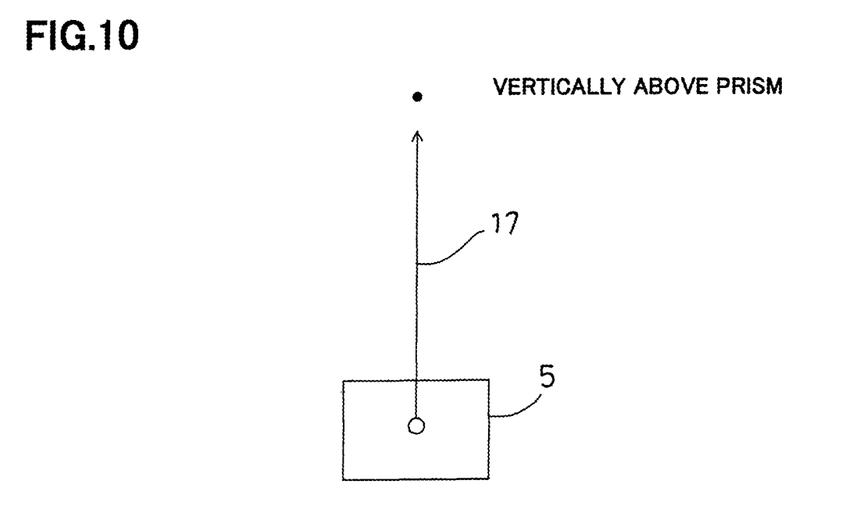
FIG. 10 is an operation explanatory drawing showing a second application example.

FIG. 10 shows a second application example. In the second application example, the prism device 5 is directed upward. By directing the prism device 5 upward, it is possible to attach a measured coordinate position vertically above.

Figure 11:
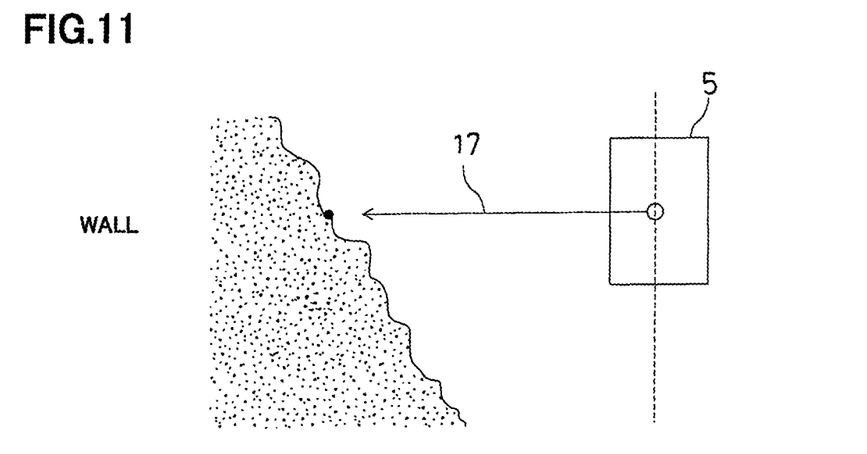
FIG. 11 is an operation explanatory drawing showing a third application example.

FIG. 11 shows a third application example. In the third application example, the prism device 5 is put into a sideways position and the laser beam 17 is made to project in a horizontal direction. In the third application example, it is possible to attach the measured height to a wall or the like.

Figure 12:
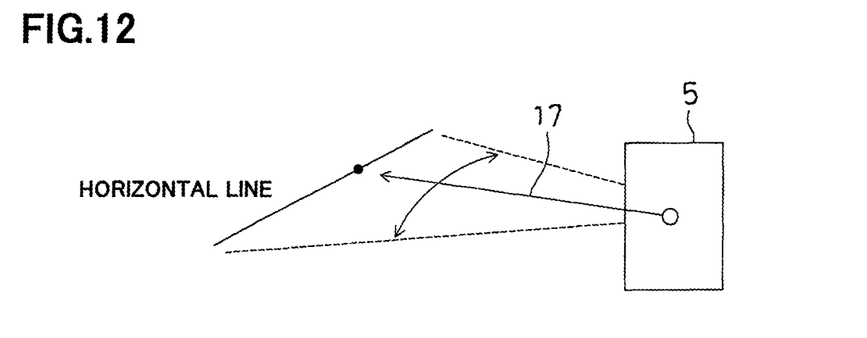
FIG. 12 is an operation explanatory drawing showing a fourth application example.

FIG. 12 shows a fourth application example. In the fourth application example, the laser beam 17 is made to project in a horizontal direction and to scan back and forth, and a horizontal line is formed on a wall surface.

In any of the second to fourth application examples, since the prism device 5 has the tilting sensor 15, it is possible to attach a position and to draw a line in a desired direction in accordance with a posture of the prism device 5 based on the detection result of the tilting sensor 15.

It is to be noted that in the embodiments described above, one MEMS mirror 18 is rotatable about two axes crossing at right angles. However, two MEMS mirrors 18, each being rotatable about one axis, may be combined so as to cross the axes of rotation at right angles.

Moreover, the invention is not limited to the MEMS mirror 18 and simply has to be provided with a rotatably supported mirror and a drive unit for rotating the mirror.

The invention claimed is:
1. A survey setting point indicating device, comprising a prism device and a support member, wherein said prism device comprises a laser emitting device for emitting a laser beam, an omnidirectional prism having a cavity in a center, a mirror which is provided in said cavity, is rotatable about two axes crossing at right angles, and can deflect, in an arbitrary direction, said laser beam emitted from said laser emitting device, and a control unit for controlling a posture or a rotation of said mirror, wherein said support member supports said prism device, and wherein said laser beam is configured to attach (transfer) a position of a center of said prism device to a required surface.

2. The survey setting point indicating device according to claim 1, wherein said control unit controls said mirror so that a trajectory of a point projected by said laser beam on the surface becomes a predetermined pattern.

3. The survey setting point indicating device according to claim 1 or 2, wherein said prism device has a tilting sensor, and said control unit controls said mirror so that said laser beam is made to project vertically or horizontally based on a detection result of said tilting sensor.

4. The survey setting point indicating device according to claim 3, wherein said support member can be tilted, and an adjustment of an attached position of said laser beam is made possible by a tilting of said support member.

5. The survey setting point indicating device according to claim 3, wherein said mirror is a MEMS mirror.

6. The survey setting point indicating device according to claim 1 or 2, wherein said support member can be tilted, and an adjustment of an attached position of said laser beam is made possible by a tilting of said support member.

7. The survey setting point indicating device according to claim 1 or 2, wherein said mirror is a MEMS mirror.

8. A surveying system, comprising a survey setting point indicating device and a surveying instrument, wherein said survey setting point indicating device comprises a prism device which includes a laser emitting device for emitting a laser beam, an omnidirectional prism having a cavity in a center, a mirror which is provided in said cavity, is rotatable about two axes crossing at right angles, and can deflect, in an arbitrary direction, said laser beam emitted from said laser emitting device, a tilting sensor, and a control unit for controlling a rotation of said mirror, a support member for supporting said prism device, and a first communication unit and wherein said surveying instrument comprises a second communication unit, is set in a known point, and measures a position of said survey setting point indicating device, wherein said surveying instrument transmits a measured position of said omnidirectional prism and a position of a survey setting point to said survey setting point indicating device, and wherein said control unit controls said mirror so that said laser beam projects the survey setting point based on the position of said omnidirectional prism and the position of the survey setting point received by said first communication unit.

9. The surveying system according to claim 8, wherein said control unit controls said mirror so that a trajectory of a point projected by said laser beam on a surface becomes a predetermined pattern containing said survey setting point and a current position of said omnidirectional prism.

10. The surveying system according to claim 9, wherein the predetermined pattern is a straight line, and one end of said straight line is the current position of said omnidirectional prism and the other end of the straight line is the survey setting point.

11. The surveying system according to claim 9, wherein the predetermined pattern is a circle with the current position of said omnidirectional prism as a center, and a radius of said circle is a distance from the current position of said omnidirectional prism to the survey setting point.

12. The surveying system according to claim 9, wherein said predetermined pattern is an ellipse with the current position of said omnidirectional prism as a center, and one end of a major axis of the ellipse is the survey setting point.

13. The surveying system according to claim 9, wherein said control unit controls a posture of said mirror so that said laser beam is made to project vertically downward.

14. The surveying system according to claim 8 or 13, wherein said survey setting point indicating device includes a guidance notification unit, and in a case where the position of said omnidirectional prism falls within a measurement allowable error range with respect to the survey setting point, said guidance notification unit makes a notification that the position of said omnidirectional prism falls within the measurement allowable error range.

15. The surveying system according to claim 8, 9, or 13, wherein said mirror is a MEMS mirror.

* * * * *